B. HOLT.
TRACTOR TRUCK MECHANISM.
APPLICATION FILED APR. 30, 1917.
1,317,650.
Patented Sept. 30, 1919.
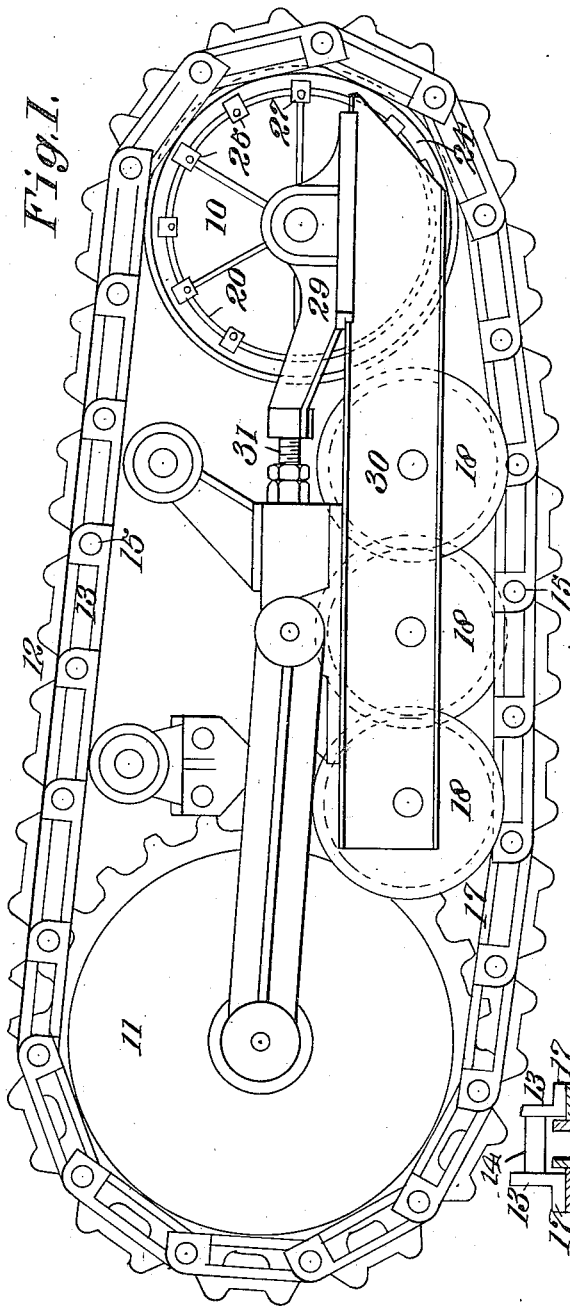
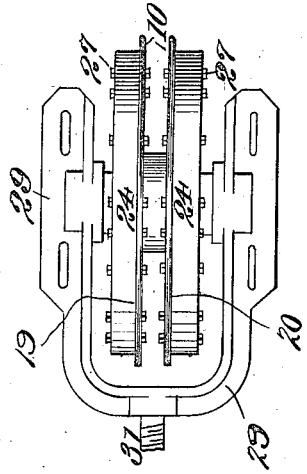
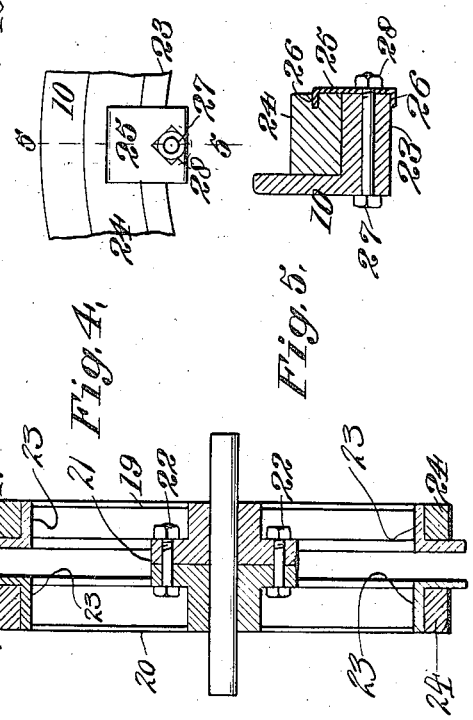
WITNESSES:
INVENTOR
Benjamin Holt
BY Strong & Townsend
ATTORNEYS

UNITED STATES PATENT OFFICE.

BENJAMIN HOLT, OF STOCKTON, CALIFORNIA.

TRACTOR-TRUCK MECHANISM.

1,317,650.     Specification of Letters Patent.     Patented Sept. 30, 1919.

Application filed April 30, 1917. Serial No. 165,338.

*To all whom it may concern:*

Be it known that I, BENJAMIN HOLT, a citizen of the United States, residing at Stockton, in the county of San Joaquin and State of California, have invented new and useful Improvements in Tractor-Truck Mechanism, of which the following is a specification.

This invention relates to guide and drive wheels for endless chain tracks, such as used in tractors of the self-laying track type; and has for its object to eliminate noise and vibration in the contacting of the chain with the wheels and also to reduce wear on the wheels and chain.

This object I accomplish by the provision of pads or cushions upon the sides of the wheel fellies to receive and support the rail heads of the track links in such position as to prevent clashing of the links against the wheels and relieve a considerable portion of the wear upon the wheels and track. The pads which receive the wear and cushion the contact are inexpensive and are quickly and easily renewable.

One form which my invention may assume is exemplified in the following description and illustrated in the accompanying drawings, in which—

Figure 1 shows a side elevation of a tractor truck mechanism embodying my invention.

Fig. 2 shows a plan view of the blank rim idler or guide wheel at the front of the truck mechanism.

Fig. 3 shows a transverse sectional view of the same.

Fig. 4 shows a detail of the rim portion of the same.

Fig. 5 shows a sectional view, taken on line 5—5 of Fig. 4.

The tractor truck mechanism shown herein is merely for the purpose of better illustrating my invention, and comprises a front blank rim idler or guide wheel 10 and a rear toothed rim drive wheel 11, over which operates an endless chain track 12, the latter being made up of a series of articulated link sections, each section comprising spaced side plates 13, connected together at one end by a sleeve or gudgeon block 14, cored to receive a journal pin 15 for connecting adjacent links together. The sleeves or gudgeon blocks constitute also pin teeth to engage with the sprocket teeth on the drive wheel 11. The side bars 13 have rail heads 17 on their inner longitudinal edges forming a continuous track for supporting a series of rollers 18, the latter being connected to the tractor or vehicle frame and supporting the entire weight of the same. The side bars 13 of the link sections straddle the rims of the wheels 10 and 11 in operation.

In prior constructions the link sections in moving into engagement with the wheels cause considerable noise and clatter by reason of the clashing of the gudgeon blocks or pin teeth 15 against the rims of the wheels. Moreover, these rims being made narrow to permit the links to straddle them will quickly wear down, as will also the pin teeth of the chain track, on account of the small wearing surface exposed.

The present invention aims to eliminate this noise and clatter in the operation of the tractor truck mechanism and also to reduce the wear upon the chain and wheels. For this purpose I construct one or both of the wheels in two transverse sections 19 and 20, as shown in Fig. 3, which sections are spaced apart by blocks 21, near their centers, and are detachably connected by transversely extending bolts 22. Each of the sections has a circular flange 23 at or near its rim upon which is carried a pad 24 of rubber, fiber, or other soft and non-metallic substance. At intervals on the flanges 23 are clips 25, each having inturned flanges 26 at its opposite ends, the outer flange entering the pad, as shown in Fig. 5, and the inner flange passing beneath the flange 23. A bolt 27 extends through the flange 23 and secures the clip in place, clamping the same securely against the pad 24. Preferably the bolts 27 extend through but one section of the wheel and are provided with a nut or head 28 resting against the inner face of the wheel section. These clips prevent creeping of the pads upon the flanges 23.

The pads 24 are so positioned as to receive and support the rail heads of the track links in such a way as to prevent substantial contact between the track and metallic wheel. The wear thus falls directly upon the pads and noise is eliminated. The pads are quickly and easily renewable when worn down. It is desirable in this connection to have the wheels adjustable relatively to each other to take up slack caused by the quick wearing of the pads, and I show a yoke 29 in which the wheel 10 is journaled, which yoke may be adjusted fore and aft on the truck frame 30 by reason of an adjustable connection 31. Inasmuch as a cushion is required only beneath the central portion of the link sections the flanges 23 and pads 24 may be interrupted instead of continuous, as shown.

The position of the pads may be such that the links are supported in place thereon with their teeth 14 slightly raised from the periphery of the wheel, so that all of the radial pressure on the wheel is taken up by the soft and non-metallic pads.

Various changes in the construction and arrangement of the several parts herein shown and described may be employed without departing from the spirit of my invention as disclosed in the appended claims.

Having thus described my invention, what I claim and desire to secure by Letters Patent is—

1. In a tractor truck mechanism, an endless chain track made up of a series of articulated link sections, each comprising spaced side bars, a blank rim guide wheel formed in two transverse sections over which said track operates, and continuously extending resilient means carried on the outer sides of the fellies of the wheel sections to receive and support the inner longitudinal edges of said side bars.

2. In a tractor truck mechanism, an endless chain track made up of a series of articulated link sections, each comprising spaced side bars, a blank rim guide wheel formed in two transverse sections over which said track operates, continuously extending flanges formed on the outer sides of the fellies of the wheel sections to receive and support the inner longitudinal edges of said side bars, said wheel sections being detachably connected at their central portions and spaced apart at and near their peripheries, and pads detachably secured upon the flanges by means of bolts carrying clips in engagement with the pads and passing through the flanges with their heads engaging the inner faces of the wheel sections.

3. In a tractor truck mechanism, the combination with an endless chain track made up of a series of articulated link sections, of a blank rim guide wheel formed in two transverse sections over which said track operates and continuously extending resilient means carried on the outer peripheries of said transverse wheel sections to support the inner longitudinal edges of the track links.

4. In a tractor truck mechanism the combination with an endless chain track made up of a series of articulated link sections, of a blank rim guide wheel formed in two transverse sections and having coöperating fellies over which said track operates and resilient tire bands extending one around each of said fellies to receive and yieldably support the inner longitudinal edges of the track links.

5. In a tractor truck mechanism an ider wheel over which an endless chain track may pass, said wheel comprising complementary wheel sections fixed in spaced relation to each other, annular flanges extending from the contiguous edges of said wheel fellies, resilient tires mounted upon said fellies and adapted to rest against the flanges, whereby the inner longitudinal edges of the links of the chain track will be supported.

6. A wheel for tractor trucks comprising complementary wheel sections having hub parts adapted to be bolted together, wheel fellies supported one from each of said hub parts and disposed in spaced relation to each other, annular flanges formed along the adjacent edges of said fellies and extending outwardly and parallel to each other, whereby an annular angle-sectioned seat will be formed entirely around each of the wheels, resilient tires carried upon each of said seats to yieldably support the inner longitudinal edges of track links and clip members adapted to be detachably secured to the wheel fellies and at intervals therearound to engage the tires and hold them in position.

In testimony whereof I have hereunto set my hand in the presence of two subscribing witnesses.

BENJAMIN HOLT.

Witnesses:
R. E. MANN,
DAN N. GILMORE.